Oct. 1, 1940.                E. T. SLAYTON ET AL                2,216,139
                                   GEAR CUTTER
                         Filed Sept. 30, 1937            2 Sheets-Sheet 1
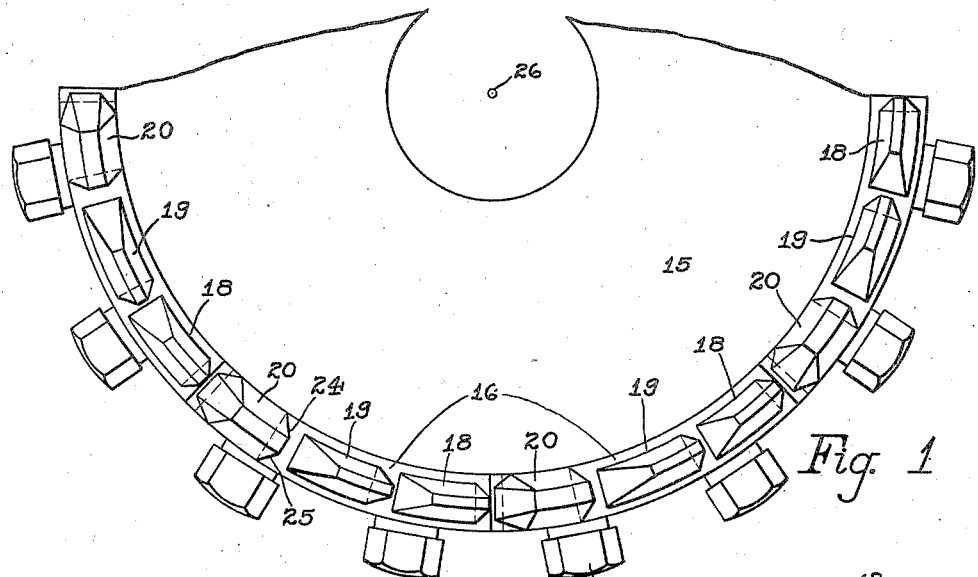
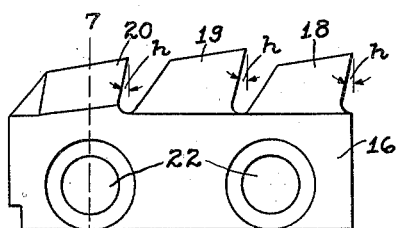
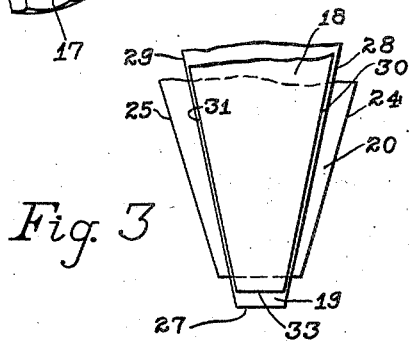
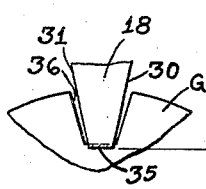 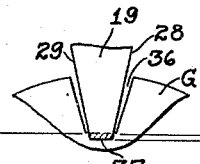 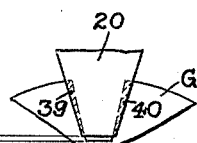 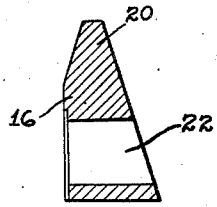
Fig. 4   Fig. 5   Fig. 6   Fig. 7
Ensign T. Slayton and
Richard E. Moyer
INVENTORS
BY *B. F. Schlesinger*
ATTORNEY

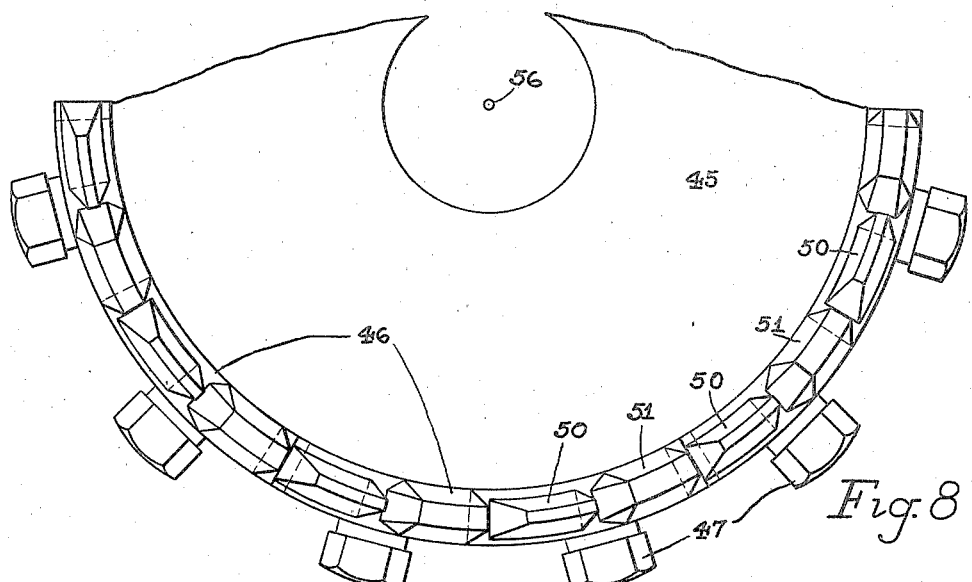
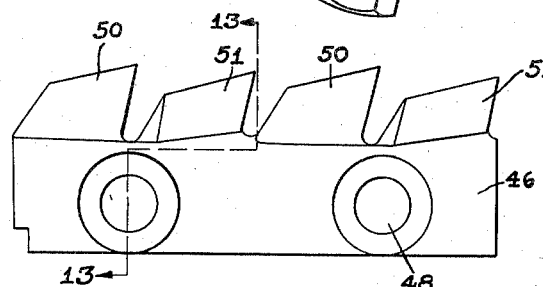 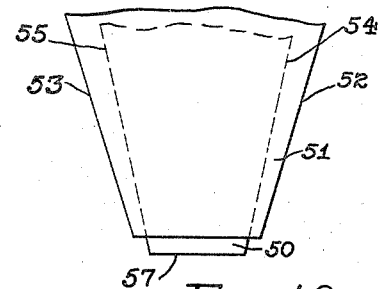
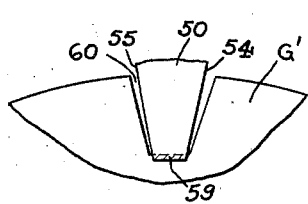 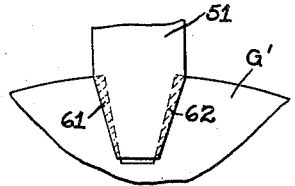 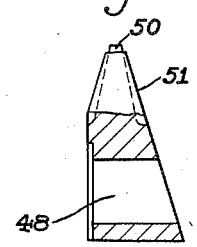

Patented Oct. 1, 1940

2,216,139

UNITED STATES PATENT OFFICE 2,216,139

GEAR CUTTER

Ensign T. Slayton and Richard E. Moyer, Rochester, N. Y., assignors to Gleason Works, Rochester, N. Y., a corporation of New York Application September 30, 1937, Serial No. 166,547

15 Claims. (Cl. 29—103)

The present invention relates to tools for rough-cutting gears and particularly to tools of the face-mill type for rough-cutting longitudinally curved tooth gears such as spiral bevel and hypoid gears. The invention is an improvement upon that of the copending application of Arthur L. Stewart and Allan H. Candee, Serial #15,410, filed April 9, 1935.

One object of the invention is to provide a more efficient cutter, one which will be capable of faster gear-production than the cutter of the prior application above mentioned.

A further object of the invention is to provide a cutter which is simpler to sharpen than the prior form of cutter and which can be sharpened in much less time and with much less handling.

Other objects of the invention will be apparent hereinafter from the specification and from the recital of the appended claims.

In a roughing cutter made according to the present invention, as in the cutter of the prior application mentioned, there are a plurality of bottom-cutting blades and a plurality of side-cutting blades. The cutter of the present invention differs from the cutter of the prior application in that the side-cutting blades are made so that each will cut on the two sides of a tooth slot of a gear blank simultaneously. It differs further from the cutter of the prior invention in that the front faces of the side as well as of the bottom-cutting blades are preferably ground with a "hook," that is, with the front face of each blade inclined rearwardly from the tip to the body portion of the blade considered in the direction of rotation of the cutter. This latter feature has distinct advantages as regards sharpening.

A standard face-mill gear cutter, such as is employed in the finish-generating of gears or such as was usually employed for the rough-cutting of gears prior to the invention of the above mentioned application, is provided with alternate inside and outside cutting blades and the front faces of alternate blades are, therefore, oppositely inclined with reference to radii of the cutter. To sharpen such a cutter, it is necessary to make two set-ups of a sharpening machine, one for sharpening the inside blades and the other for sharpening of the outside blades.

The roughing cutter of the prior application above mentioned has inside, outside and bottom-cutting blades. The front faces of the bottom-cutting blades have a "hook," while the front faces of the inside and outside blades are oppositely inclined to radial lines, as in the standard face-mill cutter. A cutter made according to the invention of the prior application mentioned requires, therefore, three set-ups for sharpening, one for the inside blades, one for the outside blades, and one for the bottom-cutting blades. These set-ups are obviously time-consuming and costly.

In a cutter made according to the present invention, the side-cutting blades are preferably "hooked" to get good cutting action on both side-cutting edges of the blades. The bottom-cutting blades are also preferably "hooked" to provide good cutting action and the "hook" of the bottom-cutting blades is preferably made the same as the "hook" of the side-cutting blades. Hence all the blades of the cutter can be sharpened in one set-up of the sharpening machine. The cutter of the present invention, then, is not only easier to sharpen than the cutter of the prior application mentioned, but also easier to sharpen than the standard face-mill gear cutter.

In addition, because of the fact that the side-cutting blades are double-edged, the cutter of the present invention is a more efficient cutting tool. Two different embodiments of the invention are illustrated in the accompanying drawings.

In one embodiment of the invention, there are two separate series of bottom-cutting blades. The blades of both series project axially beyond the side-cutting blades so as to cut in the bottoms of the tooth slots and relieve the side-cutting blades of such cutting, but the blades of one series of bottom-cutting blades project axially beyond the blades of the other series of bottom-cutting blades so that the blades of each series of bottom-cutting blades may operate efficiently. The blades of a cutter made according to this embodiment of the invention are, therefore, arranged in groups of three, a side-cutting blade which cuts on the two sides of a tooth space of the blank, a bottom-cutting blade which projects axially beyond the side-cutting blade and cuts in the bottom of the tooth space, and a second bottom-cutting blade which projects axially beyond the first named bottom-cutting blade and also cuts in the bottom of the tooth space. Considered in the direction of rotation of the cutter, the first blade of the group is the shorter bottom-cutting blade, the second blade of the group is the longer bottom-cutting blade and the final blade of the group is the side-cutting blade. The longer bottom-cutting blade jects beyond the shorter side-cutting blade, by a distance at least as great as the distance the cutter is fed between the cuts of successive blades and the shorter bottom-cutting blade projects beyond each side-cutting blade at least the same amount. With this embodiment of the invention, there are two cuts taken in the bottom of a tooth space, each deeper than the other, and then a cut taken on the two sides of the space. This form of cutter has the advantage that the cuts in the bottoms of the tooth spaces are distributed over twice as many bottom-cutting blades as in the cutter constructed according to the invention of the prior application mentioned while the number of side-cutting edges in the cutter may remain the same. Hence the cutter is a longer-lived tool than the tool of the prior application.

In the other embodiment of the invention, the blades are arranged in pairs, that is, the bottom-cutting blades alternate with the side-cutting blades. The side-cutting blades are double-edged as before and the bottom-cutting blades project axially beyond the side-cutting blades, as before. The bottom-cutting blades here, however, are all of the same height. This embodiment of the invention has the advantage over the form of tool described in the prior application in that double the number of side-cutting edges is obtained without any decrease in the number of bottom-cutting blades. So again a tool is obtained which has a longer life or with which faster production may be achieved without any decrease in its life.

In both embodiments of the invention, the bottom-cutting blades are preferably made with sides of smaller pressure angle than the corresponding sides of the side-cutting blades so that the bottom-cutting blades may more readily clear the sides of the tooth space as they take their cuts.

A cutter made according to the present invention is particularly adapted for the rough-cutting of gears in an operation where the blank is held stationary during cutting and the roughing of the tooth slot is accomplished by feeding the rotating cutter relatively into the blank until full depth position has been reached and then withdrawing the cutter and indexing the blank. A cutter constructed according to the present invention may be employed, also, however, for roughing out gears in a generating operation. In either case, the bottom-cutting blades of the cutter cut chips out of the bottom of the tooth space being cut and the side-cutting blades take chips from the sides of the space and the burden of cutting is divided between the two types of blades so that any tendency of chips from the sides and bottoms of the tooth space to weld on the point of a blade is obviated and moreover danger of overheating and "burning" of the blades is eliminated.

In the drawings:

Fig. 1 is a fragmentary plan view of a face-mill gear cutter of the segmental type constructed according to one embodiment of this invention;

Fig. 2 is a developed elevational view of one of the cutting segments of this cutter;

Fig. 3 is a diagrammatic view showing the two bottom cutting blades of a segment superimposed upon the side-cutting blade of that segment and illustrates the preferred proportions of the side and bottom-cutting blades of a cutter constructed according to this embodiment of the invention;

Figs. 4, 5 and 6 are diagrammatic views illustrating the successive cuts taken in a gear blank by a group of blades when they are arranged in the manner illustrated in Figs. 1, 2 and 3;

Fig. 7 is a section through one of the cutting segments taken, for instance, on the line 7—7 of Fig. 2;

Fig. 8 is a fragmentary plan view of a face-mill gear cutter of the segmental type constructed according to a further embodiment of this invention;

Fig. 9 is a developed side elevation of one of the segments of this cutter;

Fig. 10 is a diagrammatic view showing a bottom-cutting blade of this cutter superimposed upon a side-cutting blade of the cutter and illustrating the preferred proportions of the side and bottom-cutting blades;

Figs. 11 and 12 are diagrammatic views illustrating the successive cuts taken in a gear blank by a cutter such as illustrated in Figs. 8, 9 and 10; and Fig. 13 is a view on the line 13—13 of Fig. 9 looking in the direction of the arrows.

Reference will be had first to the cutter illustrated in Figs. 1 to 7 inclusive. This cutter comprises a rotary head 15 and a plurality of cutting segments 16. The segments are secured to the periphery of the cutter head 15 by screws 17 that pass through holes 22 in the segments and thread into the cutter head. In the embodiment of the invention illustrated, each segment comprises three cutting blades or teeth denoted respectively at 18, 19 and 20. These cutting blades or teeth are integral with one another and with the body portion of the segment. The segments may be mounted and positioned upon the head in any suitable manner. As illustrated in Fig. 7, the body portions of the segments are provided with conical inside surfaces to seat against a conical peripheral surface formed on the cutter head 15 and are positioned preferably in accordance with the principles of the invention of the copending application of James E. Gleason, Serial No. 120,728, filed January 15, 1937.

The blades 18 and 19 of each segment are bottom-cutting blades and the blade 20 is a side-cutting blade. The blades 20 are, however, sharpened so that each has two side-cutting edges on opposite sides of the blades. As illustrated each blade is ground with a plane front-face that is equally inclined to the side faces 24 and 25 of the blade. To enable the side-cutting blades to cut more freely, the front-face of each is ground with a "hook," that is, it is inclined rearwardly from the tip of the blade to the body portion of the segment. The angle of this front "hook" is designated at $h$ in Fig. 2.

The width of the side-cutting blades 20 is greater than the width of the bottom-cutting blades, measured in any plane perpendicular to the axis 26 of the cutter, that is, the opposite sides 24 and 25 of the side-cutting blades are offset radially inwardly and outwardly, respectively, of the axis of the cutter with reference to the corresponding sides 28 and 29, respectively, of the bottom-cutting blades 19 and and the corresponding sides 30 and 31, respectively, of the bottom-cutting blades 18. Thus the blades 20 cut on the sides of the tooth spaces and the blades 18 and 19 are relieved of side-cutting.

The blades 18 and 19 extend beyond the side-cutting blades 20 measured in the direction of the axis of the cutter. The blades 18 extend axially beyond the side-cutting blades 20 a distance at least as great as the distance the cutter is fed relatively to the gear blank between the cuts of successive blades. The blades 19 extend axially beyond the blades 18 at least this same distance.

Both the blades 18 and 19 are ground so that the front faces have the same inclination to the opposite sides 28 and 29 or 30 and 31, respectively, of the blades and these blades are also ground with a front "hook." The angle $h$ of the front "hook" of the bottom-cutting blades is preferably made the same as the angle $h$ of "hook" of the side-cutting blades, as illustrated in Fig. 2 so that both side and bottom cutting blades can be sharpened in one set-up of the sharpening machine.

Because of their axial projection beyond the side-cutting blades, the blades 18 and 19 relieve the side-cutting blades 20 of cutting in the bottoms of the tooth slots.

Each bottom-cutting and side-cutting blade is relieved on both sides and its tip to provide cutting clearance. The bottom-cutting blades are preferably made with sides of positive pressure angle, as shown in Fig. 3 for strength and to maintain the point width of the blades throughout their life. Preferably, however, the bottom-cutting blades are made with opposite sides of smaller pressure angle, that is less inclination to the axis of the cutter, than are the corresponding sides of the side-cutting blades. This is illustrated clearly in Fig. 3. The bottom-cutting blades 18 are preferably made of the same point width, that is, width at their tips, as the bottom-cutting blades 19 but, of course, the point width of both these blades is less than the point width of the side-cutting blades. Due to the projection of the blades 19 beyond the blades 18, in any plane perpendicular to the axis 26 of the cutter head the bottom-cutting blades 18 are of less width from side to side than the bottom-cutting blades 19, as illustrated in Fig. 3.

Figs. 4 to 6 inclusive show the action of the cutter described in roughing out the tooth slot of a gear G. In the cutting operation, the cutter is rotated continuously on its axis 26 and simultaneously relative feed movement is produced between the cutter and the gear blank in the direction of tooth depth. The blades are shown in Figs. 4 to 6 inclusive in the positions which they occupy after the cutter had already been fed relatively some distance into the tooth space 36 of the gear blank. In Fig. 4, one of the bottom-cutting blades 18 is shown in the action of taking its cut. As this blade moves across the face of the gear blank, in the rotation of the cutter, its top-cutting edge 33 takes out the chip 35, shown in shaded lines, from the bottom of the tooth space 36 of the blank. The sides 30 and 31 of this blade do not cut on the sides of the tooth space because the sides of this blade are of smaller pressure than the side-cutting edges of the side-cutting blades 20 and hence have clearance with reference to the sides of the tooth slot.

Between the time that a bottom-cutting blade 18 takes its cut and the succeeding bottom-cutting blade 19 takes its cut, the cutter will have been fed further in relative to the gear blank because the relative feed movement between the cutter and blank is continuous during cutting. The bottom-cutting blade 19 projects, however, beyond the bottom-cutting blade 18 a distance at least as great as the distance that the cutter is fed into the blank between the action of successive blades and usually the bottom-cutting blades 19 will be made to project beyond the bottom-cutting blades 18 slightly more than this distance. A bottom-cutting blade 19 will, therefore, take a chip 37 out of the bottom of the tooth space 36 of the gear blank as it moves across the face of the blank, taking its cut. The sides 28 and 29 of the blade 19 being of smaller pressure angle than the sides 24 and 25 of the side-cutting blade 20 will clear the sides of the tooth slot.

The cutter is fed relatively further into the gear blank between the time that the bottom-cutting blade 19 takes its cut and the following side-cutting blade 20 begins to cut. However, the bottom-cutting blade 19 projects beyond the bottom-cutting blade 18 a distance greater than the amount of this feed and so the side-cutting blade 20 does not cut in the bottom of the tooth slot. It cuts only on the sides of the tooth slot, removing the chips indicated in shaded lines at 39 and 40 in Fig. 6.

The successive cuts proceed in the fashion shown in Figs. 4 to 6 until the tooth slot has been cut to its full depth. Then the cutter is withdrawn from engagement with the blank and the blank indexed. The cutter is then fed again into the blank to cut a new tooth space.

The cutter illustrated in Fig. 1 has twenty-four cutting blades comprising eight bottom-cutting blades 18, eight bottom-cutting blades 19, and eight side-cutting blades 20. In Fig. 8, we have illustrated another embodiment of the invention in which the cutter also has 24 blades. Here, however, there are twelve bottom-cutting blades and twelve side-cutting blades and the bottom-cutting blades alternate with the side-cutting blades around the periphery of the cutter head. This cutter has, therefore 50% more side-cutting edges than the cutter illustrated in Fig. 1 and only 25% less bottom-cutting blades.

The cutter illustrated in Fig. 8 is again of the segmental type. It comprises a rotary head 45 and a plurality of cutting segments 46 which are secured to the head by bolts 47 that pass through holes 48 in the segments.

In the form illustrated, each segment has four cutting blades or teeth that are integral with one another and with the body portion of the segment. These blades or teeth comprise alternate bottom and side-cutting blades 50 and 51, respectively. The bottom-cutting blades 50 are all made of the same height and all project axially beyond the side-cutting blades 51. The side-cutting blades 51 are ground with plane front faces which are equally inclined to their opposite side faces so as to provide opposite side-cutting edges and the front face of each blade is also preferably ground with a "hook" so as to provide freer cutting action for the side-cutting edges. The side-cutting blades are of greater point width than the bottom-cutting blades so that their opposite sides 52 and 53 are offset radially inwardly and outwardly, respectively, with reference to corresponding sides 54 and 55, respectively, of the bottom-cutting blades, as shown in Fig. 10. So the side-cutting blades relieve the bottom-cutting blades 50 of the side-cutting operation.

Each side-cutting and bottom-cutting blade is relieved on its side and its tip back of its front face. The bottom-cutting blades have their faces ground with a front "hook" which is preferably of equal angle to the "hook" of the side-cutting blades so that, as before, both the side and bottom-cutting blades can be sharpened in a single set-up of a cutter sharpening machine. The bottom-cutting blades are again preferably made with sides of positive pressure angle to provide the desired strength, side-clearance, and to maintain the point width of the blades through their life. The pressure angles of the sides 54 and 55 of the bottom-cutting blades is preferably, however, less than the pressure angle of the corresponding sides 52 and 53, respectively, of the side-cutting blades, as before.

Figs. 11 and 12 show the action of this cutter in the roughing-out of the tooth slots of a gear G'. In the cutting operation, the cutter rotates continuously on its axis 56 and simultaneously a relative feed movement is produced between the cutter and blank in order to cut tooth spaces of the required depth in the blank. The blades are shown in Figs. 11 and 12 in the positions which they occupy after the cutter has been fed some distance into the blank.

In Fig. 11, one of the bottom-cutting blades 50 is shown in the action of taking its cut. As this blade moves across the face of the gear blank, its top-cutting edge 57 takes out the chip 59 shown in shaded lines, from the bottom of the tooth space 60 of the gear blank. The sides 54 and 55 of the bottom-cutting blade being of smaller pressure angle than the corresponding sides of the side-cutting blades have clearance with reference to the sides of the tooth slots. Between the time that a blade 50 takes its cut and the succeeding side-cutting blade 51 comes into operation, the cutter will have been fed further relatively into the gear blank, but since the bottom-cutting blade 50 projects beyond the side-cutting blade 51 a greater distance than the distance that the cutter is fed between the time the two successive blades take their cut, the side-cutting blade will not cut in the bottom of the tooth slot. It will cut on both sides of the tooth slot removing the chips denoted by the shaded lines at 61 and 62 in Fig. 12.

The successive cuts proceed in the fashion shown in Figs. 11 and 12 until the tooth slot has been cut to its full depth. Then the cutter is withdrawn and the blank indexed. Then the cutter is again returned into engagement with the blank to cut a new tooth space.

In both embodiments of the invention shown, the sides of the side-cutting blades are offset radially inwardly and outwardly with reference to corresponding sides of the bottom-cutting blades and hence may take slight cuts with the portions of their tips that project at each side beyond the sides of the bottom-cutting blades. In each case, however, the depth cutting in the slots is really done by the bottom-cutting blades. The slight chips cut by the tips of the side-cutting blades do not overheat these blades and cannot adhere to them.

It is possible, of course, to avoid having the side-cutting blades do any tip-cutting. This can be done by making the side-cutting blades of exactly the same point width as the bottom-cutting blades. Then the side-cutting blades will only cut on the sides of the tooth slots and will do this only by virtue of their greater pressure angle as compared with the pressure angle of the bottom-cutting blades.

The invention has been illustrated in connection with cutters of the segmental type, but it is to be understood that it is equally applicable to cutters having inserted cutting blades. The number and arrangement of bottom and side-cutting blades may, of course, be varied from the arrangement illustrated in the drawings. Further, while the invention has been illustrated in connection with cutters of the face-mill type, it is to be understood that it is applicable, also, to other forms of gear-cutting tools as, for instance, disc-type milling cutters. The present application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A gear cutting tool comprising a rotary head and a plurality of annularly arranged cutting blades which are secured to the head and project beyond one side face of the head in the general direction of the axis of the head, certain of said blades projecting axially of the head beyond others of the blades and others of said blades having their opposite sides offset radially inwardly and outwardly, respectively, beyond the corresponding sides of the first mentioned blades, all of said blades being relieved on their sides and tips back of their front faces.

2. A gear cutting tool comprising a rotary head and a plurality of annularly arranged cutting blades which are secured to the head and project beyond one side face of the head in the general direction of the axis of the head, certain of said blades projecting axially beyond others of the blades and others of the blades having their opposite sides offset radially inwardly and outwardly, respectively, beyond the corresponding sides of the first mentioned blades, all of the blades having sides of positive pressure angle and the first mentioned blades having their opposite sides less inclined to the axis of the cutter than the corresponding sides of the other blades, and all of said blades being relieved on their sides and tips back of their front faces.

3. A gear cutting tool comprising a rotary head and a plurality of annularly arranged cutting blades which are secured to the head and project beyond one side face of the head in the general direction of the axis of the head, alternate blades projecting axially of the head beyond the rest of the blades, and the rest of the blades having their opposite sides offset radially inwardly and outwardly, respectively, beyond the corresponding sides of the first mentioned blades, all of said blades being relieved on their sides and tips back of their front faces.

4. A gear cutting tool comprising a rotary head and a plurality of annularly arranged cutting blades which are secured to the head and project beyond one side face of the head in the general direction of the axis of the head, alternate blades projecting axially of the head beyond the rest of the blades, and the rest of the blades having their opposite sides offset radially inwardly and outwardly, respectively, beyond the corresponding sides of the first mentioned blades, all of the blades being relieved on their sides and tips back of their front faces and all of said blades having sides of positive pressure angle, the first mentioned blades having their opposite sides inclined to the cutter axis at smaller angles than the corresponding sides of the other blades.

5. A gear cutting tool comprising a rotary head and a plurality of annularly arranged cutting blades which are secured to the head and project beyond one side face of the head in the general direction of the axis of the head, alternate blades projecting axially of the head beyond the rest of the blades, and the rest of the blades having their opposite sides offset radially inwardly and outwardly, respectively beyond the corresponding sides of the first mentioned blades, all of said blades being relieved on their sides and tips back of their front faces and each of said blades having its front face inclined rearwardly from its tip, considered in the direction of rotation of the head.

6. A gear cutting tool comprising a rotary head and a plurality of annularly arranged cutting blades which are secured to the head and project beyond one side face of the head in the general direction of the axis of the head, alternate blades projecting axially of the head beyond the rest of the blades, and the rest of the blades having their opposite sides offset radially inwardly and outwardly, respectively, beyond the sides of the first mentioned blades, all of said blades being relieved on their sides and tips back of their front faces and each of said blades having its front face inclined rearwardly from its tip, considered in the direction of rotation of the head, the rearward inclination of the front faces of the blades being the same on all blades.

7. A gear cutting tool comprising a rotary head and a plurality of annularly arranged cutting blades which are secured to the head and project beyond one side face of the head in the general direction of the axis of the head, alternate blades projecting axially of the head beyond the rest of the blades, and the rest of the blades having their opposite sides offset radially inwardly and outwardly, respectively, beyond the corresponding sides of the first mentioned blades, all of said blades being relieved on their sides and tips back of their front faces, all of said blades having sides of positive pressure angle and the first mentioned blades having their opposite sides inclined to the cutter axis at smaller angles than the corresponding sides of the other blades, and each of said blades having its front face inclined rearwardly from its tip, considered in the direction of rotation of the head, the rearward inclination of the front faces of the blades being the same on all blades.

8. A gear cutting tool comprising a rotary head and a plurality of annularly arranged cutting blades which are secured to the head and project beyond one side face of the head in the general direction of the axis of the head, certain of the blades projecting axially of the head beyond others of the blades, and others of said blades having their opposite sides offset radially inwardly and outwardly, respectively, beyond the corresponding sides of the first mentioned blades, each of said blades being sharpened so that its front face forms equal angles with its opposite side faces and is inclined rearwardly from the tip of the blade to the body portion thereof, considered in the direction of rotation of the head, and all of the blades being relieved on their sides and tips back of their front faces.

9. A gear cutting tool comprising a rotary head and a plurality of annularly arranged cutting blades which are secured to the head and project beyond one side face of the head in the general direction of the axis of the head, certain of the blades projecting axially of the head beyond others of the blades, and others of the blades having their opposite sides offset radially inwardly and outwardly, respectively, beyond corresponding sides of the first mentioned blades, each of said blades being sharpened so that its front face forms equal angles with its opposite side faces and is inclined rearwardly from the tip of the blade to the body portion thereof, considered in the direction of rotation of the head, all of said blades being relieved on their sides and tips back of their front faces, and all of said blades having sides of positive pressure angle, the blades first mentioned having their opposite sides less inclined to the axis of the head than the corresponding sides of the other blades.

10. A gear cutting tool comprising a rotary head and a plurality of annularly arranged cutting blades which are secured to the head and project beyond one side face of the head in the general direction of the axis of the head, certain of said blades projecting axially of the head beyond others of the blades and others of the blades having their opposite sides offset radially inwardly and outwardly, respectively, beyond the corresponding sides of the first mentioned blades, each of said blades having its front face forming equal angles with its opposite side faces and inclined rearwardly from the tip of the blade to the body portion thereof considered in the direction of rotation of the head, and all of the blades being relieved on their sides and tips back of their front faces.

11. A gear cutting tool comprising a rotary head and a plurality of annularly arranged cutting blades which are secured to the head and project beyond one side face of the head in the general direction of the axis of the head, certain of the blades projecting axially of the head beyond others of the blades and others of the blades having their opposite sides offset radially inwardly and outwardly, respectively, beyond the corresponding sides of the first mentioned blades, each of said blades having its front face forming equal angles with its opposite side faces and inclined rearwardly from the tip of the blade to the body portion thereof considered in the direction of rotation of the head, the rearward inclination being the same on all blades, all of said blades being relieved on their sides and tips back of their front faces and all of said blades having sides of positive pressure angle, the first mentioned blades having their opposite sides less inclined to the axis of the head than the corresponding sides of the other blades.

12. A gear cutting tool comprising a rotary head and a plurality of annularly arranged cutting blades which are secured to the head and project beyond one side face of the head in the general direction of the axis of the head, said blades being arranged in groups of three, each group comprising a side-cutting blade and two bottom-cutting blades, one of the bottom-cutting blades projecting axially of the head beyond the other bottom-cutting blade and both of the bottom-cutting blades projecting axially of the head beyond the side-cutting blade, said side-cutting blade being sharpened to have side cutting edges at each side which are offset, respectively, radially inwardly and outwardly with reference to corresponding sides of the bottom-cutting blades, all of said blades being relieved on their sides and tips back of their front faces.

13. A gear cutting tool comprising a rotary head and a plurality of annularly arranged cutting blades which are secured to the head and project beyond one side face of the head in the general direction of the axis of the head, said blades being arranged in groups of three, each group comprising a side-cutting blade and two bottom-cutting blades, one of the bottom-cutting blades projecting axially of the head beyond the other bottom-cutting blade and both of the bottom-cutting blades projecting axially of the head beyond the side-cutting blade, the side-cutting blade being sharpened to have side-cutting edges at each side which are offset, respectively, radially inwardly and outwardly with reference to corresponding sides of the bottom-cutting blades, all of the blades being relieved on their sides and tips back of their front faces and all of the blades having sides of positive pressure angle, the bottom-cutting blades having sides less inclined to the axis of the head than corresponding sides of the other blades.

14. A gear cutting tool comprising a rotary head and a plurality of annularly arranged cutting blades which are secured to the head and project beyond one side face of the head in the general direction of the axis of the head, said blades being arranged in groups of three, each group comprising a side-cutting blade and two bottom-cutting blades, one of the bottom-cutting blades projecting axially of the head beyond the other bottom-cutting blade and both of the bottom-cutting blades projecting axially of the head beyond the side-cutting blade, the side-cutting blade being sharpened to have opposite side-cutting edges at each side which are offset, respectively, radially inwardly and outwardly with reference to corresponding sides of the bottom-cutting blades, all the blades being relieved on their sides and tips back of their front faces and each of the blades having its front face inclined rearwardly from its tip considered in the direction of rotation of the head, the rearward inclination of the front faces of the blades being the same on all blades.

15. A gear cutting tool comprising a rotary head and a plurality of annularly arranged cutting blades which are secured to the head and project beyond one side face of the head in the general direction of the axis of the head, said blades being arranged in groups of three, each group comprising a side-cutting blade and two bottom-cutting blades, one of the bottom-cutting blades projecting axially of the head beyond the other bottom-cutting blade and both of the bottom-cutting blades projecting axially of the head beyond the side-cutting blades, the side-cutting blades being sharpened to have side-cutting edges at each side which are offset radially inwardly and outwardly, respectively, with reference to corresponding sides of the bottom-cutting blades, all of said blades being relieved on their sides and tips back of their front faces, all of said blades having sides of positive pressure angle, the bottom-cutting blades having opposite sides less inclined to the axis of the head than the corresponding sides of the side-cutting blades, and each of said blades having its front face inclined rearwardly from its tip, considered in the direction of rotation of the head, the rearward inclination being the same on all blades.

ENSIGN T. SLAYTON.
RICHARD E. MOYER.